(12) United States Patent
Ma et al.

(10) Patent No.: US 11,768,363 B2
(45) Date of Patent: Sep. 26, 2023

(54) METHOD AND APPARATUS FOR MICROSCOPY IMAGING WITH RESOLUTION CORRECTION

(71) Applicant: FUDAN UNIVERSITY, Shanghai (CN)

(72) Inventors: Jiong Ma, Shanghai (CN); Baoju Wang, Shanghai (CN); Longfang Yao, Shanghai (CN)

(73) Assignee: FUDAN UNIVERSITY, Shanghai (CN)

( * ) Notice: Subject to any disclaimer, the term of this patent is extended or adjusted under 35 U.S.C. 154(b) by 42 days.

(21) Appl. No.: 17/010,875

(22) Filed: Sep. 3, 2020

(65) Prior Publication Data

US 2021/0063720 A1    Mar. 4, 2021

(30) Foreign Application Priority Data

Sep. 4, 2019   (CN) .......................... 201910830344.8

(51) Int. Cl.
    *G02B 21/36*   (2006.01)
    *G02B 21/00*   (2006.01)
    *G06T 3/40*    (2006.01)

(52) U.S. Cl.
    CPC ....... *G02B 21/365* (2013.01); *G02B 21/0032* (2013.01); *G02B 21/0052* (2013.01); *G06T 3/4053* (2013.01); *G06T 3/4092* (2013.01)

(58) Field of Classification Search
    CPC .............. G02B 21/365; G02B 21/0032; G02B 21/0052; G02B 21/0072; G02B 21/367; G02B 27/58; G01N 21/6458; G01N 15/1434; G01N 21/64; G01N 2015/144; G01N 2021/6417
    See application file for complete search history.

(56) References Cited

U.S. PATENT DOCUMENTS

| | | | | |
|---|---|---|---|---|
| 5,995,227 A | * | 11/1999 | Velzel | G01B 9/04 356/512 |
| 2012/0319007 A1 | * | 12/2012 | Kempe | G01N 21/6458 250/459.1 |
| 2014/0198198 A1 | * | 7/2014 | Geissbuehler | G01N 21/6408 348/79 |
| 2018/0024063 A1 | * | 1/2018 | Egner | G02B 21/0076 359/386 |
| 2018/0180404 A1 | * | 6/2018 | Hunt | G01B 11/24 |
| 2018/0372476 A1 | * | 12/2018 | Kassamakov | G01B 9/02035 |
| 2018/0372593 A1 | * | 12/2018 | Templier | B26D 7/32 |

* cited by examiner

*Primary Examiner* — Richard T Torrente
(74) *Attorney, Agent, or Firm* — Ware, Fressola, Maguire & Barber LLP

(57) ABSTRACT

A method and apparatus for microscopic imaging is provided. The method includes: illuminating the sample with illumination radiation to stimulate the detection radiation; capturing the detection radiation from the sample; with the intensity data of the detection radiation from the sample; applying the calibration algorithm to the captured image(s) to acquire the processed second image; the resolution of the processed second image is higher than the acquired first image.

14 Claims, 8 Drawing Sheets

METHOD AND APPARATUS FOR MICROSCOPY IMAGING WITH RESOLUTION CORRECTION

TECHNICAL FIELD

This invention belongs to the technical field of microscopy imaging, particularly relates to a microscopic imaging of the method and apparatus.

BACKGROUND ART

In the modern optical imaging technical field, fluorescence microscopy has the advantages of specific labeling and dynamic imaging of living cells. It has been widely used in life science research. However, due to the limitation of the diffraction limit, the traditional optical microscope has a lateral resolution of 200-350 nm, which is limited to about half a wavelength. This resolution limits its dynamic research in the field of life sciences at the subcellular level of less than 200 nm. Wherein such core hole center position (approximately 30 nm), microtubule diameter (an outer diameter of approximately 25 nm, an inner diameter of about 14 nm), vesicles and some subcellular size are not larger than 50 nm, or even not greater than 30 nm.

In recent years, in order to break the diffraction limit, a variety of super-resolution optical microscopy techniques have been proposed by scientific researchers, such as light activated positioning microscopy based on single-molecule positioning technology, random optical reconstruction microscopy, etc., Stimulated Emission Depletion Microscopy, Structured Illumination Microscopy based on changing the spatial structure of the illumination light, super-resolution microscopy based on random optical fluctuations, etc. Here, super-resolution refers to the resolution beyond the diffraction limit.

SUMMARY OF THE DISCLOSURE

The aspect of the present invention is to provide an image microscopic imaging method and device with ultra-high image resolution and excellent imaging quality.

The present invention provides a method of microscopic imaging, including the following steps:

Providing Sample(s);

Illuminating the sample with illumination radiation and detecting detection radiation, wherein the detection radiation is caused by illuminating the sample with illumination radiation;

Detecting the detection radiation to capture at least one first image, with the intensity data of detection radiation emitted from the sample;

Calculating the processed second image from the at least one first image by using a correction algorithm;

Wherein, the first image has a first resolution, and the second image has a second resolution higher than the first resolution.

In an example of case, the detection radiation includes an optical signal, especially a fluorescent signal.

In an example of case, capturing the at least one first image employed at least one of the following technologies: Structured Illumination Microscopy, Stimulated Emission Depletion Microscopy, Confocal Microscopy with a detection array, and/or Light-activated Positioning Microscopy.

In an example of case, capturing at least one first image includes assembling original images, wherein structured light illumination radiation with different illumination directions with different phase information is used to assemble a set of original images; the assembling of original images includes detecting radiation caused by structured light illumination radiation with different illumination directions and different phase information.

In an alternative example of cases, capturing at least one first image includes assembling original images, wherein the assembling of original images includes detecting radiation at each original image generated in the detection plane of each detector element.

In an example of case, capturing at least one first image further includes the following steps:

Based on the assembling of generated original images, use the first reconstruction algorithm to reconstruct the original image to obtain the first image, where the first reconstruction algorithm is a three-phase reconstruction algorithm and/or a four-phase reconstruction algorithm, and the first image has the data of the intensity information of the detected radiation of the sample; and In the same detection area of the sample, capture at least one first image at a specified time interval, wherein the at least one first image is configured as an image sequence sorted at the specified time interval.

In an example of case, the designated time interval is at least not greater than 50 ms, and the number of at least one first image is not less than 50 frames.

In an example of case, the correction algorithm includes a radial fluctuation positioning algorithm, and the radial fluctuation positioning algorithm is configured to locate and mark the intensity center position of the detection radiation based on the radial fluctuation positioning algorithm for each first image in the at least one first image, Thereby, at least one third image of the marked center position of the intensity is obtained, wherein the at least one third image is configured as an image sequence sorted at a specified time interval.

In an example of case, the correction algorithm further includes a correlation algorithm, and the correlation algorithm is configured to calculate the intensity of each pixel based on the relationship between the time series and the intensity at the same pixel position in each image in the at least one third image. Further based on the correlation factor on each pixel, obtain the second image.

In an alternative example of cases, capturing at least one first image further includes the following steps:

Based on the assembling of original images, locate and mark the center position of the intensity of the detected radiation through the radial fluctuation positioning algorithm, and obtain the collection of the fourth image accordingly;

Assembling fourth images with the first reconstruction algorithm to obtain the first image that has the already marked center position of the intensity of the detected radiation; and In the same detection area of the sample, at least one first image is captured at a specified time interval, wherein the at least one first image is configured as an image sequence sorted at the specified time interval.

In an embodiment, the correction algorithm includes a correlation algorithm, and the correlation algorithm is configured to calculate the intensity position on each pixel based on the relationship between the time series and the intensity position at the same pixel position in each image in the at least one fourth image. Further based on the correlation factor on each pixel, obtain the second image.

In an embodiment, the first resolution is not greater than 200 nm, especially not greater than 100 nm.

In an embodiment, the second resolution is less than or equal to half of the first resolution, particularly less than or equal to one third of the first resolution, particularly not greater than 30 nm.

According to another aspect, there is provided an apparatus for microscopic imaging, which is configured to perform the method as described above.

According to another aspect, there is provided a microscopic imaging device, including An illumination source module, the illumination source module comprising an illumination source that provides illumination radiation;

The illumination optical unit is configured to focus the illumination radiation into the sample to be tested;

The detection optical unit is configured to be arranged downstream of the beam path of the illumination optical unit and obtain the emitted detection radiation at a plane conjugate to the focal plane of the sample;

A detection module configured to convert the obtained detection radiation into an electrical signal; and A calculation unit configured to process the original image with the converted electrical signal, the calculation unit comprising:

An image generation module configured to realize the assembling of the original images;

Time series image generation module, in the acquisition time period, for generating a series of time-related multiple images or assembling multiple images;

The first reconstruction module is configured to use the first reconstruction algorithm to reconstruct the assembly of images in order to obtain a frame of image with the first resolution;

The positioning module is configured to use the radial fluctuation algorithm to calculate and mark the center position of the intensity of the detected radiation in the image;

The second reconstruction module uses a second reconstruction algorithm to calculate and reconstruct a plurality of images arranged in time to form an image with a second resolution;

Wherein, the first resolution is greater than the second resolution.

According to another aspect, there is provided a microscope system including a device for performing the microscopic imaging of the method described above.

The invention provides a method of microscopic imaging. By combining the optical radial wave algorithm with super-resolution fluorescence microscopy techniques such as structured light microscopy, confocal microscopy with detector arrays, etc., higher resolution images can be obtained and can be flexibly applied to a wide range of super-resolution fluorescence microscopy.

More specifically, in the case of existing super-resolution microscopy techniques, such as STORM's single-molecule microscopy technique, it is necessary, for example, that a light switch fluorescent protein can be switched between a bright state and a dark state with different lights, and repeated multiple times until photobleaching; then collect thousands or tens of thousands of images to obtain high-resolution fluorescence images. In this case, the selected fluorescent light sample is required to have high light stability, difficult to bleach and high contrast. However, due to the need to convert multiple fluorescent states and the illumination radiation irradiating the sample for a long time, a large amount of phototoxicity can be caused, and at the same time, prolonged observation may cause some degree of sample movement or uneven illumination radiation, thereby producing an artifacts image.

Compare with the single microscopy, with the present invention embodiment, artifacts in the image obtained can be effectively reduced to improve the quality of the image. For example, because the method requires only dozens or hundreds of images, acquiring images can be more rapid, and the complexity of sample preparation can be reduced, and the requirement for the fluorescence sampling can also be reduced, and thus low phototoxicity can be achieved. Advantageously, there is no need to make additional modifications to existing hardware systems for the realization of high-speed imaging system of low complexity, high SNR, the plurality of signals. In addition, since an image with a resolution of, for example, less than 50 nm and a faster acquisition speed are obtained, the present invention is suitable for observing the dynamic process of subcellular organelles in living cells. It should be understood that both the foregoing general description and the following detailed description are exemplary and are intended to provide further explanation of the claimed technology.

BRIEF DESCRIPTION OF DRAWINGS

FIG. 9 (b) is a Gaussian distribution curve of FIG. 8 (a) at position 2, FIG. 9 (c) is the Gaussian distribution curve of microtubules at position 1-1 in FIG. 8 (b), and FIG. 9 (d) is the Gaussian distribution curve of microtubes at position 2-2 in FIG. 8 (b).

DETAILED DESCRIPTION OF THE INVENTION

With the combination of Example and the accompanying drawings below, the technical solutions of the present invention will be more clearly and completely described. Obviously, the described embodiments are only a part of the embodiments of the present invention, rather than all of the embodiments. Based on the described embodiments, all other embodiments obtained by those of ordinary skill in the art without creative labor are within the protection scope of the present invention.

Unless otherwise defined, the technical and scientific terms used in the present invention should have the general meaning understood by persons with ordinary skill in the art. The "first", "second" and similar words used in the present invention do not indicate any order, quantity or importance, but are only used to distinguish different components. "Include" or "comprise" and other similar words mean that the element or item appearing before the word encompasses the element or item listed after the word and its equivalents, but does not exclude other elements or items. Similar words such as "connected" or "linked" are not limited to physical or mechanical connections, but may include electrical connections, whether direct or indirect. "Up", "Down", "Left", "Right", etc. are only used to indicate the relative position relationship. When the absolute position of the described object changes, the relative position relationship may also change accordingly.

As an example, structured light illumination super-resolution microscopy is demonstrated. Structured light illumination super-resolution microscopy can be configured to change the illumination mode of the spatial structure of the illumination radiation to image the sample. This spatial structure can be carrier frequency fringes, such as moiré pattern. Advantageously, an illumination method with a spatial structure of illuminating radiation provides high-frequency information that cannot be observed under conventional wide-field illumination methods (for example, conventional wide-field microscopy), that is, high-resolution information. Specifically, by processing and analyzing the image spectrum in the Fourier frequency domain, the high-frequency components are moved to the low-frequency range to obtain super-resolution images. Therefore, the resolution of structured light illumination super-resolution microscopy is preferably not greater than 200 nm, preferably about 100 nm.

Figure 1:
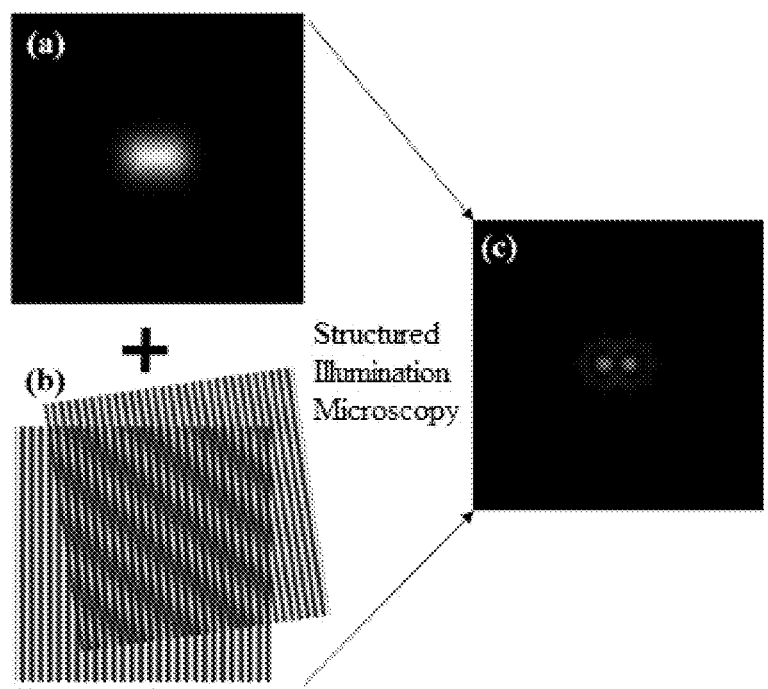
FIG. 1 is a schematic diagram of the technical principle of structured light illumination super-resolution microscopy.

FIG. 1 is a schematic diagram of the technical principle of an exemplary structured light illumination super-resolution microscopy. As shown in FIG. 1, FIG. 1(a) is a fluorescence imaging image of two particles using conventional wide-field microscopy. The distance between the two particles is smaller than the diffraction limit distance. In this case, only one elliptical bright spot is observed, but the two particles cannot be clearly distinguished. By introducing an exemplary carrier frequency fringes as shown in FIG. 1(b), it is possible to obtain information with different high-frequency components, such as a collection of images with different phase structure information. Then through the reconstruction algorithm, the acquired collection of images with different phase structure information is analyzed and reconstructed, and finally a super-resolution image with a resolution of about 100 nm is obtained, as shown in FIG. 1(c). It can be seen that, with the introduction of structured light illumination super-resolution microscopy, the two particles can be clearly distinguished, yet the true size and contour of each particle cannot be further judged. If the distance between two particles is less than 100 nm, or when a single particle is smaller than 100 nm, structured light illumination super-resolution microscopy cannot be further resolved. In addition, structured light illumination super-resolution microscopy has a certain degree of sample drift or uneven illumination radiation, which may cause reconstruction artifacts in the reconstructed image, resulting in poor image signal-to-noise ratio.

In order to solve the above-mentioned problems, an apparatus and method for microscopic imaging with further improved resolution will be described below.

Figure 2:
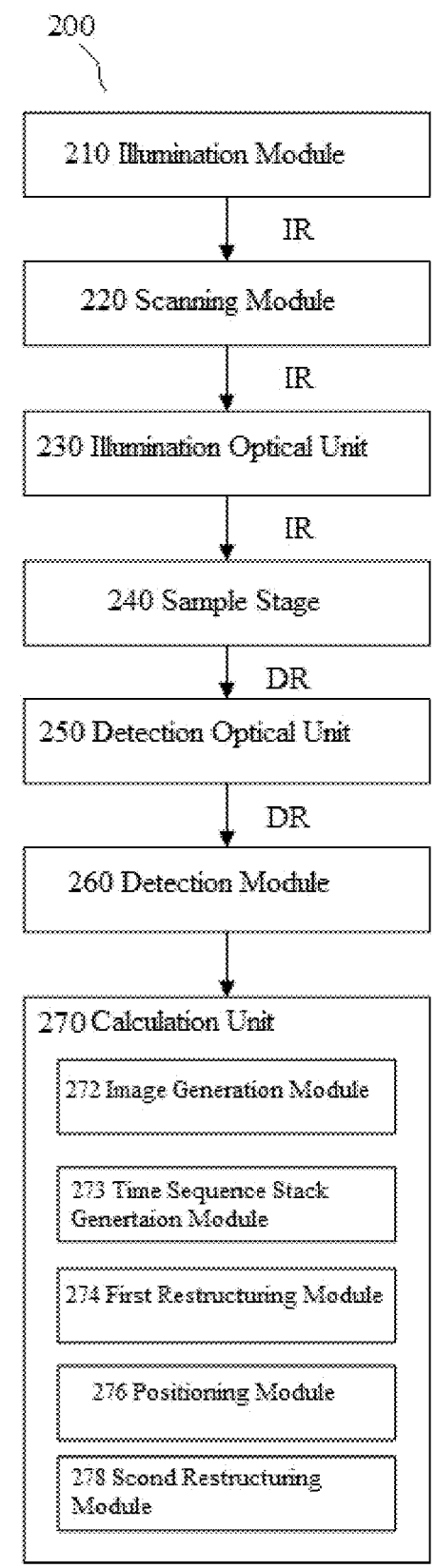
FIG. 2 is a schematic block diagram of the structure of a microscopic imaging apparatus according to an embodiment.

FIG. 2 is a schematic block diagram of the structure of a microscopic imaging apparatus according to an embodiment. Referring to FIG. 2, microscopic imaging apparatus 200 may comprise an illumination source module 210, scanning module 220, an illumination optical unit 230, a sample stage 240, an optical detecting unit 250, a detection module 260 and a calculation unit 270. Among them, the illumination source module 210, the scanning module 220, the illumination optical unit 230, the sample stage 240, the detection optical unit 250, and the detection module 260 are arranged to be optically coaxial.

In an exemplary embodiment, the illumination source module 210 may include an illumination source, a spatial structure module and an optical beam shaping module. The illumination source provides illumination radiation IR, the wavelength of which can range from near ultraviolet to near infrared. As an example, the illumination source may include a laser, a xenon lamp, and/or a mercury lamp. Preferably, the illumination source may be a picosecond pulsed or femtosecond pulsed laser. Additionally, the wavelength of the laser is configured to be tunable. In an embodiment, the spatial structure module is configured to change the lighting mode of the spatial structure of the illuminating radiation. As an example, the spatial structure module may include a spatial modulator, a phase retarder, and so on. In an embodiment, the optical beam shaping module is configured by the illumination source to provide illumination radiation IR shaping, such as a collimator. As such, the illumination source module 210 provides shaped illumination radiation IR. Alternatively, the illumination source module 210 arrangement may be omitted in the spatial structure module.

The scanning module 220 may be arranged downstream of the beam path of the illumination source module 210, and may be a scanner, such as a pair of scanning galvanometers. The scanner can be configured to use the shaped illuminating radiation IR to scan the sample area to be inspected. Specifically, the shaped illuminating radiation IR is deflectable in a controlled manner in at least two directions by the scanner. Preferably, the scanning module 220 can be arranged in, for example, a confocal microscopy imaging device with a detector array. Alternatively, in some apparatus of microscopic imaging arrangement may be omitted in the scanning module 220, e.g. structured lighting apparatus for imaging microscopy.

The illumination optical unit 230 may be arranged downstream of the scanning module 220 or an illumination source module 210 beam path, and may comprise at least one illumination lens, wherein the illumination lens may have different magnifications, for example 10-fold, 20-fold, 30-fold, 40-fold, 60-fold, or 100-fold, or even higher multiples. The illumination lens of said at least one illumination lens located in the beam path may be configured to focus the illumination radiation IR deflected by the scanner into the sample to be examined.

The sample stage 240 may be arranged downstream of the beam path of the illumination optical unit 230, and may be configured to hold a sample to be examined by a sample holder (not shown). After scanning the focal plane of the sample area to be examined using the illumination radiation IR deflected by the scanner, the substance contained in the sample is excited by the illumination radiation IR to emit detection radiation DR. As an example, the substance may include fluorescent nanomaterials such as quantum dots, green fluorescent protein, antibodies or viruses labeled with fluorescent materials, or auto-fluorescent molecules and their equivalents. Therefore, in this case, the detection radiation DR may be a fluorescent signal. Alternatively, the detection radiation DR may also be other stimulated emission signals, such as phosphorescence signals. Additionally, the sample to be examined is configured to be embedded in a cover glass, or cultivated in a petri dish, or other convenient container for observation.

The detection optical unit 250 may be arranged downstream of the beam path of the sample stage 240, and may include at least one detection objective lens, a beam splitter, an optical filter, and the like. The detection objective lens in the beam path can collect the emitted detection radiation DR, and the detection module 260 to be explained below collects the detection radiation DR at a plane conjugate to the focal plane of the sample downstream of the beam path. Notably, herein, the illumination and detection objective lens may be the same lens to simultaneously play the role of the illumination and detection, but can also be two different lenses, one for sample illumination and one for detection. In addition, the beam splitter is configured to separate the detection radiation DR from the illumination radiation IR. The optical filter may be configured to filter out the detection radiation DR having different wavelength ranges from the detection radiation DR. Among them, the optical filter can be replaced or omitted in the optical path according to the requirements. Optionally, a pinhole on the detection side can be inserted in the beam path to improve the resolution of the detection radiation DR.

The detection module 260 may be arranged downstream of the beam path of the detection optical unit, and includes at least one detector. According to the different wavelength ranges of the detection radiation DR, the detector can be selected from photodiodes, avalanche diodes, photomultiplier tubes, EMCCDs, CCDs, and/or detector arrays and combinations thereof. The detector may be configured to convert the collected detection radiation DR into an electric signal to be sent to the calculation unit 270. The electrical signal sent to the calculation unit 270 serves as the original data. For example, in the case of confocal microscopy with a detector array, a detector array can be used, where each detector element can form an image on an image plane that is conjugate to the focal plane of the sample.

The calculation unit 270 may be arranged in a calculation device, and may be configured to perform an operation of processing the original image. In an embodiment, the calculation unit 270 may include an image generation module 272, a first reconstruction module 274, a positioning module 276, and a second reconstruction module 278.

The image generation module 272 is configured to assemble the generated images. For each of the different phase structures, an image with a corresponding phase structure is generated from the received raw data, and the images with different phase structures are combined for the assembling of images with different phase structures, also referred to as the assembling of images for short. For example, in the case of structured light microscopy imaging technology, for three different phase structures, nine sets of images with corresponding phase structures are assembled.

Similarly, the time series image generation module 273 is configured to generate a series of time-related multiple images or an assembling of multiple images during the acquisition time. Among them, the collection time has a certain time interval, such as less than 30 ms, less than 20 ms, or even smaller, so as to generate more images to be processed later or an assembling of images in a relatively static collection time.

The first reconstruction module 274 is configured to reconstruct the assembling of images using the first reconstruction algorithm to obtain a frame of image with the first resolution. The first reconstruction algorithm may be a three-phase reconstruction algorithm or a four-phase reconstruction algorithm.

The positioning module 276 is configured to use the radial fluctuation algorithm to calculate and mark the intensity center position of the detection radiation DR in the image, so as to realize high-resolution positioning of the intensity center of the detection radiation DR. Wherein the radial wave algorithm may be configured to calculate the convergent degree of the radial gradient in a point spread function of the image to generate a radial gradient figure of the image.

Alternatively, the positioning module 276 may also include a pair of pixel coordinates relative to a fixed location marker center again. In the context of this description, after the image is obtained, the marker in each image is optionally located, and the pixel point coordinates of the center of the marker in the image are marked. Specifically, given the theoretically expected displacement of the two images, determine the actual displacement of the pixel coordinates of the center of the marker in the two images obtained, and then calculate the relative deviation between the actual displacement and the expected displacement shift difference, based on the pixel coordinates of the center differential and the relative offset of the marker of figure corrected two image drift, thereby reducing artifacts appearing in the image. For example, if the two images are images with different time intervals, the desired displacement can be set to zero; or if the two images are images with different phase positions, the desired displacement can be set to something other than zero. Numerical value; or if the two images are based on images collected by detection elements in different detection arrays, the desired displacement can be set to zero.

The second reconstruction module 278 is configured to use a second reconstruction algorithm to calculate and reconstruct a plurality of images arranged in a time sequence to form an image with a second resolution. The second reconstruction algorithm may be configured to detect the fluctuation in the radiation DR signal at each pixel point in the acquired image during the acquisition time sequence. In one embodiment, the correlation factor of the higher-order component may be calculated based on the image with the higher-order component that has undergone radial distribution processing, and the super-resolution image can be obtained according to the correlation factor. Because the correlation factor of fluorescent background noise or random noise through correlation accumulation calculation is very low, and the correlation factor of relatively static detection radiation DR signal is very high, which can reduce the background signal to a large extent and improve the signal-to-noise ratio, making super-resolution images possible. Advantageously, the second resolution is smaller than the first resolution.

In an exemplary embodiment, a microscope, particularly a super-resolution microscope, is provided, which includes the apparatus for microscopic imaging as described above. Specifically, the arrangement of the microscope can be equipped with an upright objective lens or an inverted objective lens. The objective lens used has a high numerical aperture, which further improves the resolution of the microscope system. Because the arrangement and advantages of the apparatus for microscopic imaging in the microscope are effectively the same as the arrangement and advantages of the apparatus for microscopic imaging as described above, they will not be repeated here.

Hereinafter, in an exemplary embodiment, FIG. 3-5 describe in detail the flowchart of the microscopic imaging method of the above-mentioned microscopic imaging device.

Figure 3:
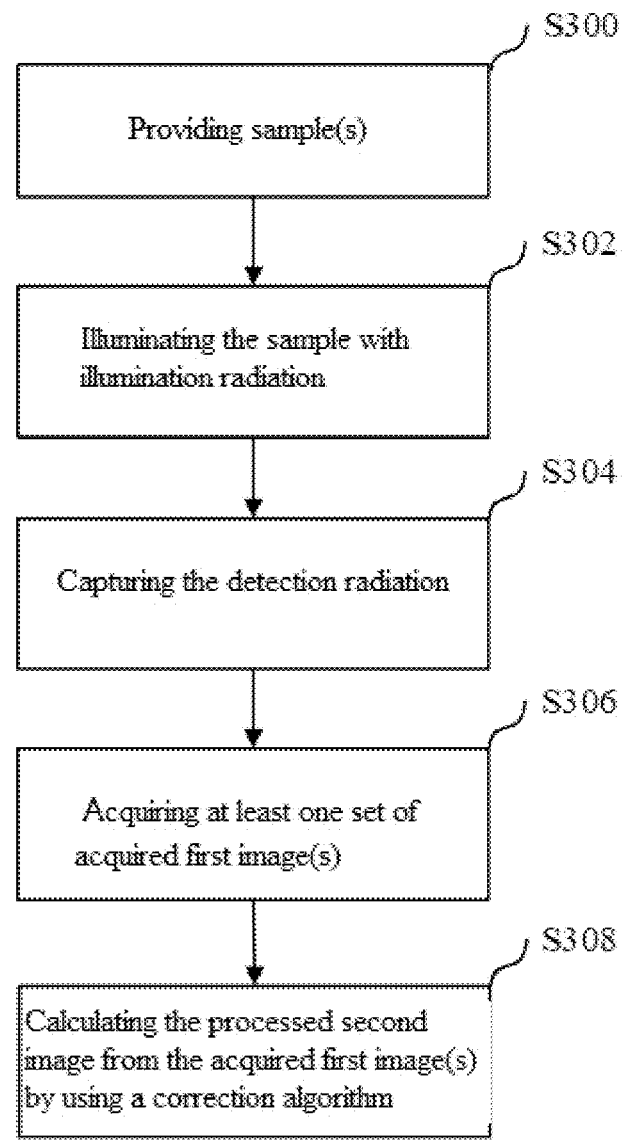
FIG. 3 is a flowchart of a method of microscopic imaging according to the first embodiment.

FIG. 3 is a flowchart of a method of microscopic imaging according to the first embodiment.

In step S300, a sample is provided, and the sample is placed on the sample stage 240 through the sample holder.

In step S302, the sample is illuminated with the illumination radiation IR provided by the illumination source module 210 through the illumination optical unit 230, so that the sample excited by the illumination radiation IR emits detection radiation DR. The emitted detection radiation DR passes through the detection optical unit 250 to reach the surface of the detection module 260. Preferably, the plane on which the surface of the detection module 260 is located and the focal plane of the sample emitting detection radiation DR are optically conjugate to each other. Preferably, the illumination source has illumination modes with different phase structures.

In step S304, the detection module 260 is used to detect the detection radiation DR of the sample. At the same time, the detected signal of the detection radiation DR is sent to the calculation unit 270 via, for example, a signal transmission line.

In step S306, at least one first image is captured by the calculation unit 270, the first image having data of intensity information of the detected radiation DR of the sample. Among them, the first image has a first resolution of about 100 nm.

In step S308, the second image is calculated from the at least one first image by the correction algorithm. In an embodiment, the second image has a second resolution smaller than the first resolution, which has a second resolution of approximately not greater than 50 nm, preferably not greater than 40 nm, and more preferably not greater than 33 nm.

Figure 4:
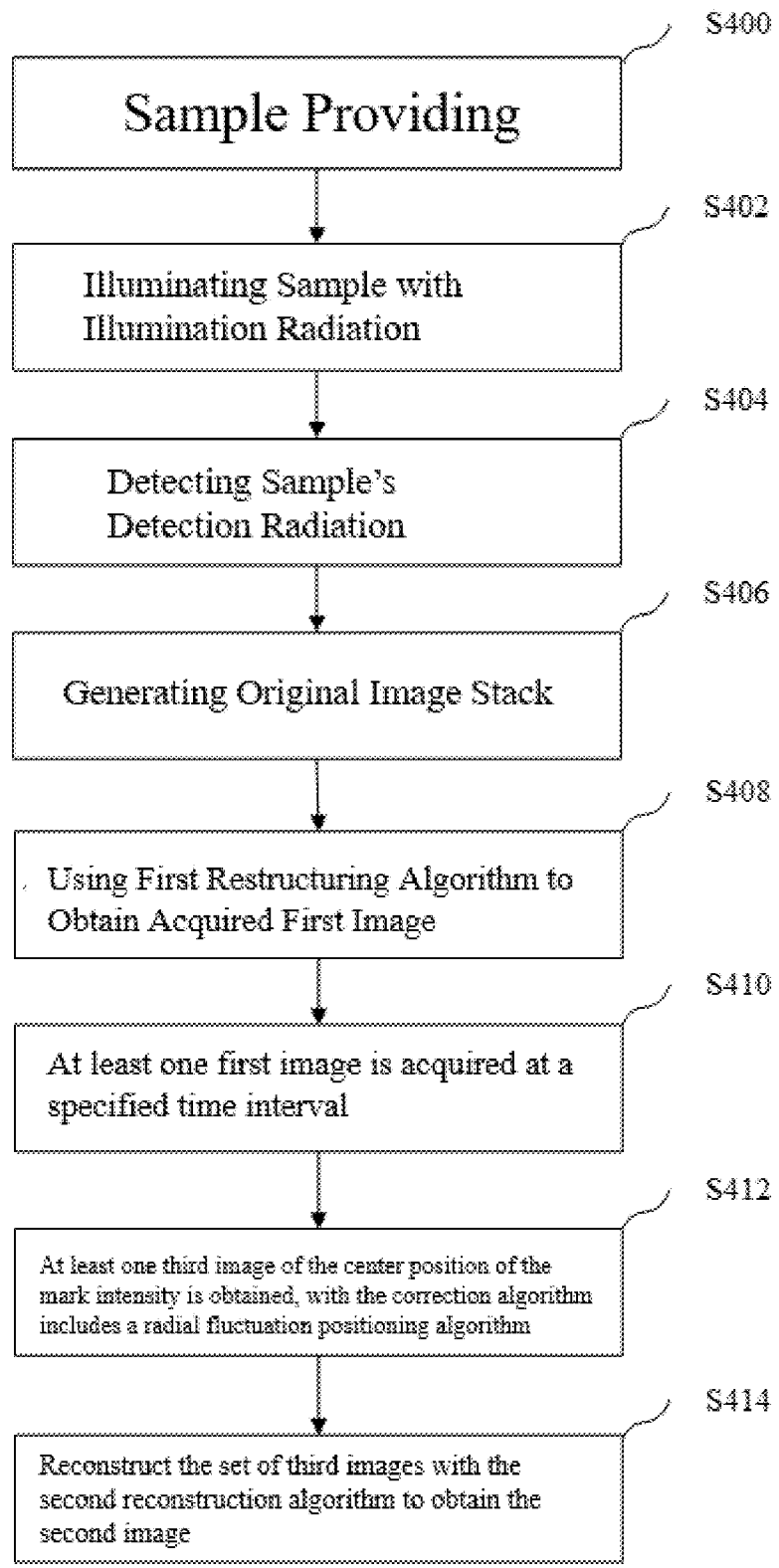
FIG. 4 is a flowchart of a method of microscopic imaging according to a second embodiment.
Figure 5:
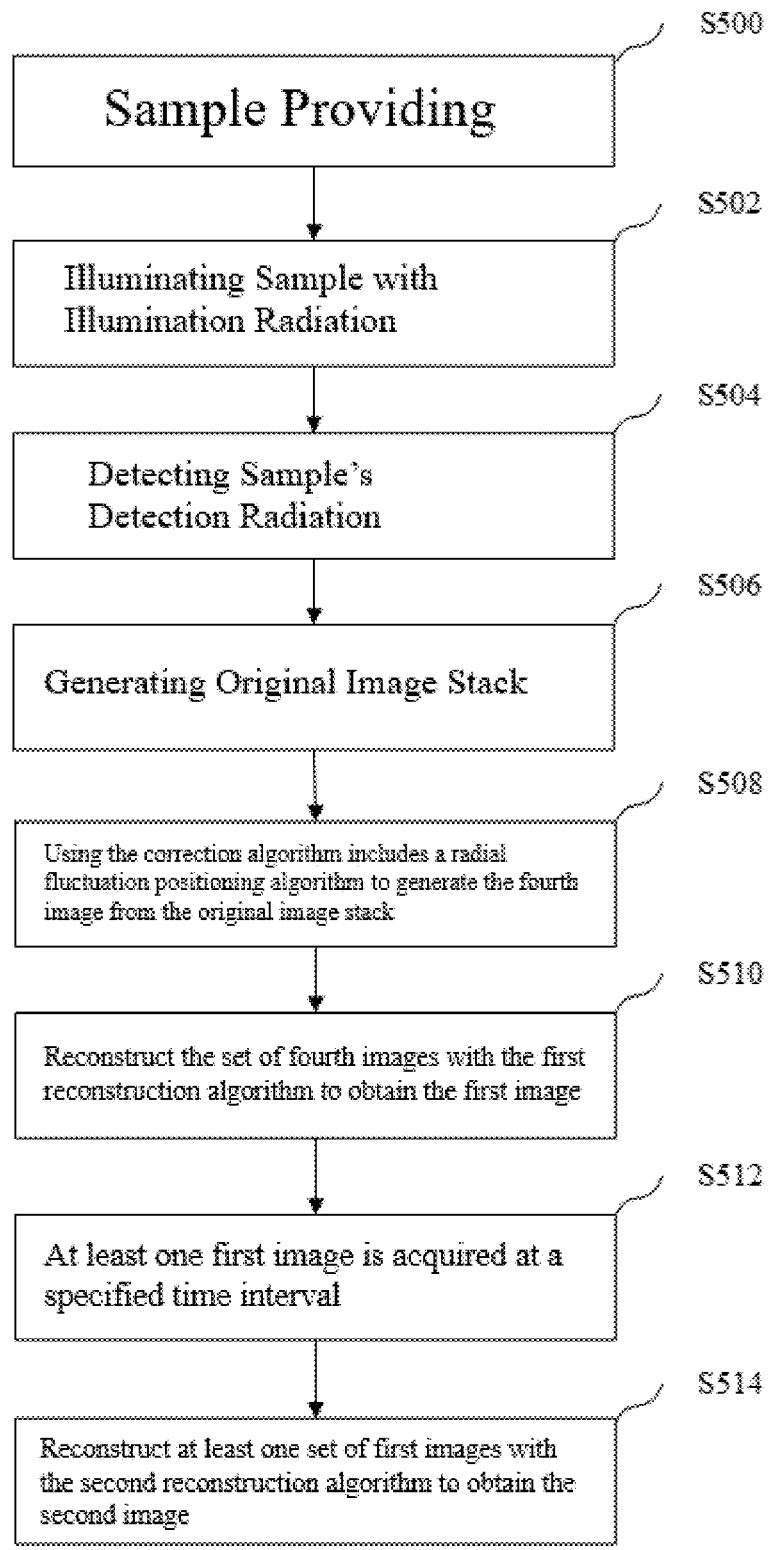
FIG. 5 is a flowchart of a method of microscopic imaging according to a third embodiment.

FIGS. 4 and 5 are embodiments according to the third embodiment and the second embodiment a method of forming microscopic flowchart. Similarly, FIG. 4 steps S400-S404 in FIGS. 4 and 3 steps S500-S504 in FIG. 5 are basically the same as steps S300-S304 in FIG. 3, they will not be repeated here. Hereinafter, focus is on the steps in FIGS. 4 and 5 that are different from those in FIG. 3.

Referring to FIG. 4, in step S406, a set of original images is assembled. The set comprises at least two original images corresponding to a mutually different original image illumination radiation detecting radiation generated phase structure. Specifically, when the illumination radiation IR has illumination modes with different phase structures, the original image of the corresponding phase structure is generated based on detecting the signal of the detection radiation DR emitted by the corresponding. The original image with different phase structure can be obtained under different illumination modes. In the context of this description, preferably, several lighting modes can be specified, and the specified number of lighting modes are periodically repeated in a certain order, which is also called the assembling of lighting modes.

As the sample is illuminated with the assembling of lighting modes, detect the detection radiation for the corresponding phase structure, and assemble the generated original images.

In an alternative embodiment, in the assembling of original images, the generated original images is are assembled in a detector array containing a plurality of detector elements. Specifically, the assembling of generated original images includes the original images generated by the detection radiation in the detection plane of each detector element. Taking the arrangement of a single detector for traditional confocal imaging as an example, the pinhole is arranged upstream of the detector, and the pinhole in space largely limits the number of photons that the detector can obtain from the Airy disk. When the pinhole is arranged upstream of the multiple detector elements in the detection array, each detection element can acquire data of multiple original images containing Airy disks to facilitate subsequent reconstruction. The arrangement of multiple detection elements can further improve the resolution of subsequent reconstructed images by collecting more photons.

In step S408, a first reconstruction algorithm is used to reconstruct the assembling of original images to obtain a first image. The first image has data of intensity information of the detected radiation DR of the sample. Among them, the first image has a first resolution of about 100 nm.

In step S410, at least one first image is acquired at a specified time interval. Preferably, the number of the first images may be no less than 30 frames, no less than 50 frames, and no less than 100 frames. The specified time interval can be as small as possible under the premise of ensuring the signal-to-noise ratio, such as less than 30 ms, less than 20 ms, or even smaller, which can achieve as much imaging assembling as possible within a period of relatively static sample (for example, several seconds) for subsequent analysis and processing. The process for obtaining the assembling of the first image may be set by calculating unit 270, or may be performed by a user manually stops the operation, wherein the parameter set includes a number of first images to be assembled, or the total time period for detecting the sample etc.

As is known, detection radiation such as fluorescent signals fluctuates randomly in a time series. In step S412, the center position of the intensity of the detected radiation is marked based on the radial fluctuation positioning algorithm to obtain at least one third image. The center position of the detection intensity has been marked in the third image.

It is worth noting that, in order to further improve the speed and efficiency of imaging, alternative embodiments may also be adopted. Once a first image is obtained in step S408, the radial fluctuation positioning algorithm is used to mark the first image to obtain a third image. In other words, it is eligible to obtain a first image, and then use the radial wave to obtain a third image location algorithm, and the constant time series to obtain at least a third image to ensure that the center position of the third image having a mark obtained. By further optimizing the sequence of processing images, the imaging time is shortened, thereby improving imaging efficiency and realizing a high-resolution third image. The third image can reduce the artifacts of the first image due to reconstruction.

In step S414, the second reconstruction algorithm is used to reconstruct at least one third image to obtain a second image. The second reconstruction algorithm is the correlation algorithm. The second image is calculated from the at least one third image by the correction algorithm. In an embodiment, the correlation algorithm is configured to calculate the correlation factor on each pixel based on the relationship between the time series and the intensity at the same pixel position in each of the at least one third image, and based on the correlation factor on each pixel obtains the second image. The obtained second image has a second resolution smaller than the first resolution, which has a second resolution of approximately not greater than 50 nm, preferably not greater than 40 nm, and more preferably not greater than 33 nm.

Subsequently, refer to FIG. 5 as the third embodiment of the microscopic imaging method. Step S508 of FIG. 5 is substantially the same as step S406 of FIG. 4, so the description will not be repeated.

Referring to FIG. 5, in step S508, in the set of original images, the center position of the intensity of the detected radiation is marked by the radial fluctuation positioning algorithm, and the set of fourth images is obtained accordingly.

In step S510, the first reconstruction algorithm is used to reconstruct the set of fourth images to obtain the first image. In principle, the first image acquired in step S510 has a better resolution than the first image acquired in step S410 because of the previous processing of the radial fluctuation algorithm.

Notably, in the practice of this embodiment, the following problems may occur: In applying the radial fluctuation algorithm prior to the process of reconstruction, each of the first images obtained would shift slightly due to the existence of high frequency signals of different phases, the first image will have artifacts caused by the sample drift. In order to prevent the sample from drifting, the marker is introduced into the sample. For example, a stable fluorescent nanomaterial with high light quantum efficiency is selected as the marker, and the position of the marker is relatively shifted. In this context, in order to eliminate artifacts, after the step of obtaining the fourth image or the first image, locate the marker in the fourth image or the first image and mark the pixel coordinates of the marker center in the marked image. Specifically, given the theoretically expected displacement of the two images, determine the actual displacement of the pixel coordinates of the marker center in the two images obtained, and then calculate the relative deviation between the actual displacement and the expected displacement The shift difference is based on the relative shift difference and the pixel coordinates of the marker center to correct the drift of the two images, thereby reducing the artifacts in the image. For example, the two images can be images with different time intervals as described below, and the desired displacement can be set to zero; or the two images can be images with different phase positions, and the desired displacement can be set to a certain value other than zero; or two different images may be an image detection array of detector elements collection based on desired shift amount can be set to zero.

In step S512, at least one first image is acquired at a specified time interval. Preferably, the number of the first image may be no less than 30 frames, no less than 50 frames, and no less than 100 frames. The specified time interval can be as small as possible under the premise of ensuring the signal-to-noise ratio, such as less than 30 ms, less than 20 ms, or even smaller, which can achieve as much imaging assembling as possible performance in the period of relatively static sample (for example, several seconds) for subsequent analysis and processing. The process for obtaining the assembling of the first image can be set by the calculation unit 270, or can be manually stopped by the user. The settable parameters include the number of frames of the first images to be assembled, or the total time period for testing the sample, etc. In step S514, the second reconstruction algorithm is used to reconstruct at least one first image to obtain a second image. The second reconstruction algorithm is the correlation algorithm. The second image is calculated from the at least one first image by the correction algorithm. In an embodiment, the correlation algorithm is configured to calculate the correlation factor on each pixel based on the relationship between the time series and the intensity at the same pixel position in each of the at least one first image, and based on the correlation factor on each pixel obtains the second image. The obtained second image has a second resolution smaller than the first resolution, which has a second resolution of approximately no greater than 50 nm, preferably not greater than 40 nm, and more preferably no greater than 33 nm.

Microscopic imaging apparatus 200 shown in FIG. 2 may include at least the step of a method as described above for operation. The microscopic imaging apparatus 200 may be included in a microscope system.

In practice, the method of microscopic imaging using the second embodiment is reproduced in a data simulation experiment.

Figure 6:
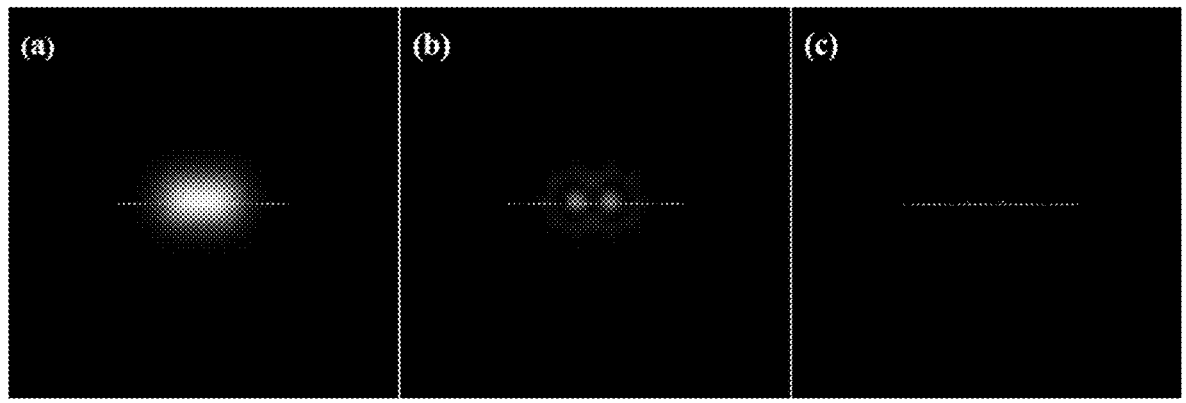
FIG. 6 (a)-(c) show simulated images of in various steps in the method of microscopy imaging according to the second embodiment.
Figure 7:
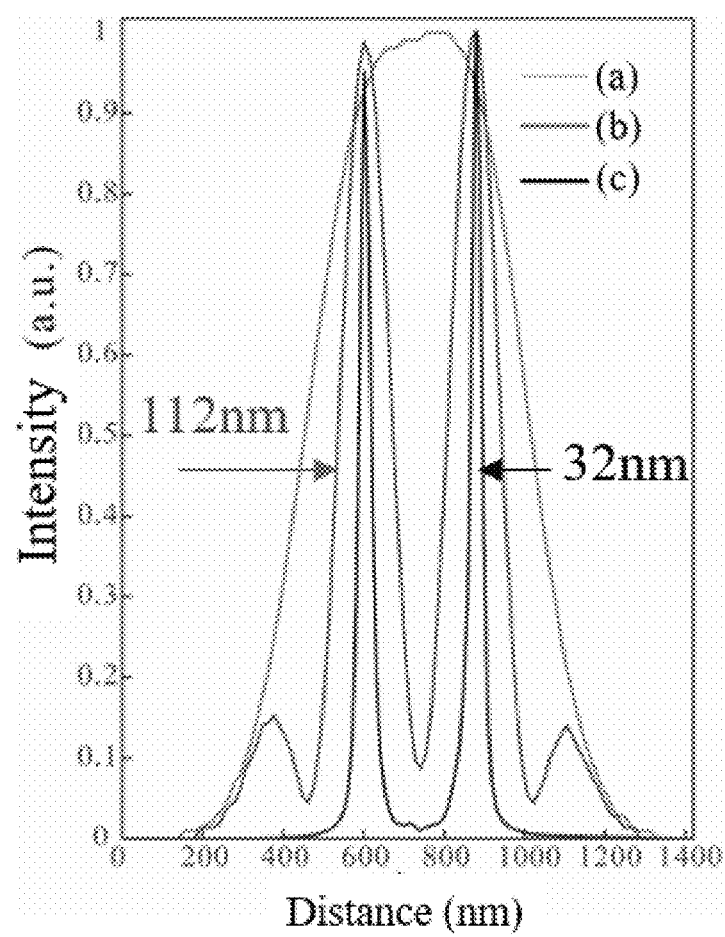
FIG. 7 is a resolution comparison chart corresponding to FIG. 6 (a)-(c).

FIG. 6(a)-(c) are the simulated images formed from various steps in the microscopic imaging method according to the second embodiment, FIG. 6(a) is the original image or wide-field microscopy image acquired by the detection unit in the simulation case, and referring to FIG. 7, the resolution of the original image is greater than 200 nm; FIG. 6(b) is the simulation case where the first image is obtained by the first reconstruction algorithm in the assembling of original images detected, and referring to FIG. 7, the resolution of the first image is 112 nm, which is about 100 nm; and FIG. 6(b) is the simulation case where the second image is obtained from at least one first image through the correction algorithm, and referring to FIG. 7, the resolution of the second image is about 30 nm. Obviously, through the method of the second embodiment, the microscopic imaging method is improved, so that a resolution of about 30 nm can be reached, and a super-resolution image with a high signal-to-noise ratio can be captured quickly and dynamically.

Figure 8:
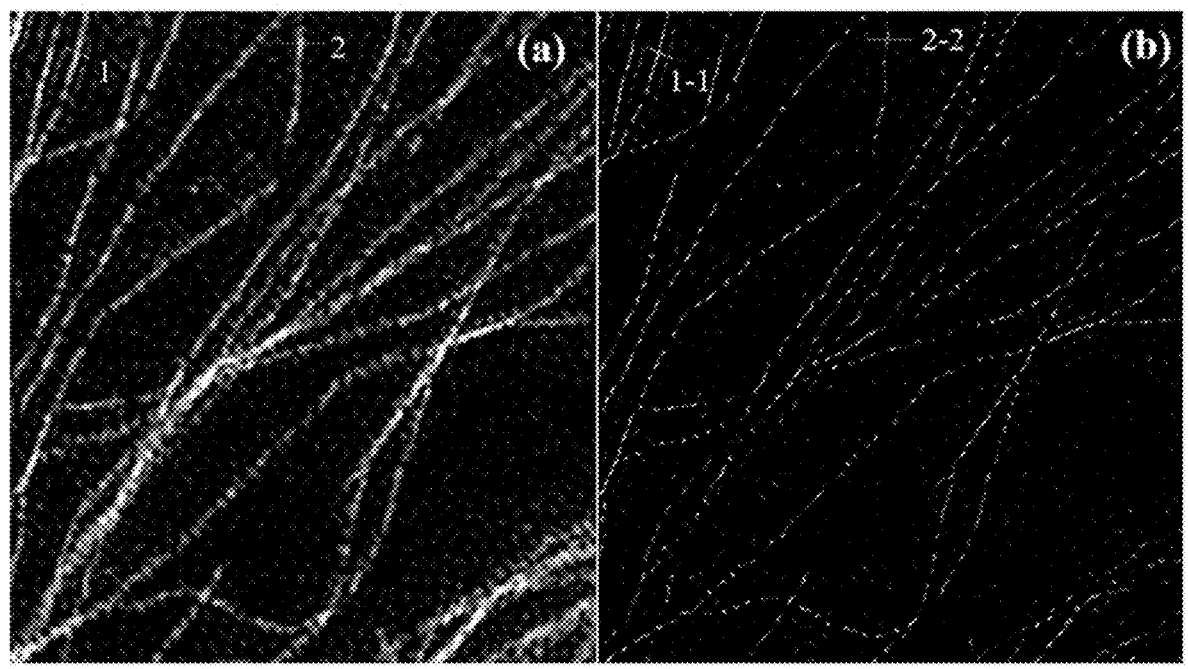
FIG. 8 (a)-(b) are super-resolution fluorescence images in each step of the method for microscopic imaging of microtubules of cells according to the second embodiment.
Figure 9:
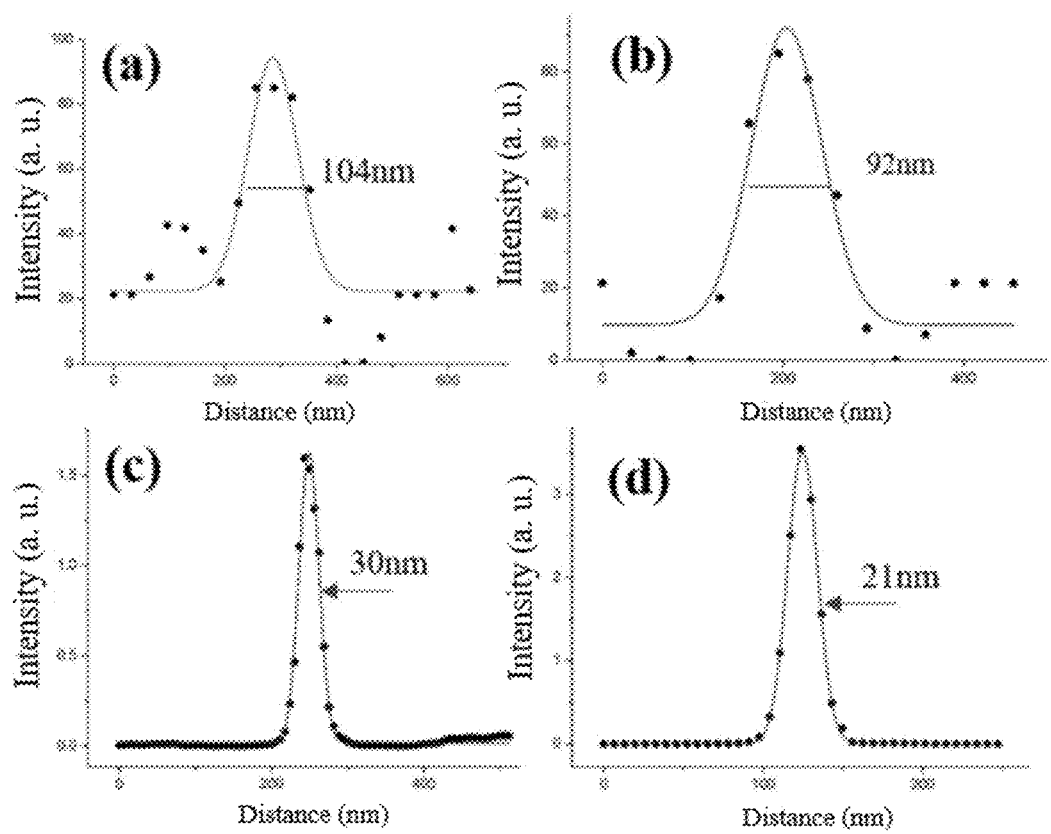
FIG. 9 (a) is a Gaussian distribution curve of FIG. 8 (a) at position 1.

FIG. 8(a) is first image obtained by the first reconstruction algorithm in the assembling of original images detected for the cell microtubules labeled with Alexa488. Then the resolutions of the microtubes at position 1 and position 2 of the mark were measured, and the resolutions were 104 nm and 92 nm, respectively, as shown in the Gaussian distribution curves of FIG. 9 (a) and (b). In addition, in the detection area of the sample in FIG. 8 (a), the exposure time interval of 30 ms and the number of acquired first images of 200 frames are set to obtain the sequential first images in the same sample detection area. That is to say at least one first image is obtained. FIG. 8 (b) is a second image obtained by a correction algorithm in at least one first image. The correction algorithm includes locating and marking the central position of the fluorescence intensity in the sequential first image, and calculating the fluctuation of each pixel in the time series in the collected time series according to the position and marking of the fluorescence center position in the time series. The correlation factor is obtained, and the correlation factor on each pixel is used to reconstruct the second image. Referring to FIG. 8(b), the microtubes at positions 1-1 and 2-2 marked correspond exactly to the microtubes at positions 1 and 2 in FIG. 8(a), and the microtubes at positions 1 and 2 as shown in FIG. 8(b). After the first image as shown in FIG. 8 (a) is subjected to a correction algorithm (which includes an optical radial fluctuation algorithm and a correlation algorithm), the resolution of the obtained second image is further improved. Specifically, the resolution of the microtubes at position 1-1 and position 2-2 are 30 nm and 21 nm, respectively, as shown in the Gaussian distribution curves of FIGS. 9(c) and (d). Therefore, the feasibility of the embodiment of the present invention has been verified in practice. With the resolution less than 30 nm, it is helpful for researchers to conduct rapid and dynamic research on subcellular organelles.

The above describes the basic principles of this application in conjunction with specific embodiments. However, it should be pointed out that the advantages, advantages, effects, etc. mentioned in this application are only examples and not limitations. These advantages, strength, efficiency etc. cannot be considered as required for each embodiment of this application. In addition, the specific details disclosed above are only for illustrative purposes and easy-to-understand functions, rather than limitations, and the above details do not limit the application to the implementation of the above specific details.

It is worth noting that the flow chart of the steps and the above method description in this application are only illustrative examples and are not intended to require or imply that the steps of the various embodiments must be performed in the order given. Some steps can be parallel, independent of each other or follow the other proper order. Further, terms such as next, then, etc. words not purport to limit the order of the steps; These terms are only used to guide the reader through the description of these methods.

The block diagrams of the devices, devices, equipment, and systems involved in the present invention are only used as illustrative examples and are not intended to require or imply that they must be connected, arranged, and configured in the manner shown in the block diagrams. It should also be pointed out that, in the device and method of the present application, each component or each step can be decomposed and/or recombined. These decompositions and/or recombination shall be regarded as equivalent solutions of this application.

What is claimed is:

1. A method for microscopic imaging, comprising:
providing a sample;
illuminating the sample with illumination radiation for producing detection radiation;
capturing the detection radiation to acquire at least one first image;
computing a second image from the at least one first image using a correction algorithm; wherein the at least one first image has a first resolution, and the second image has a second resolution higher than the first resolution, wherein the acquiring at least one acquired first image comprises assembling a set of original images, wherein the set of original images are generated by using structured light illumination with different illumination directions having different phase information; the set of original images including one or more original images that are generated by the detection radiation caused by the illumination radiation with different illumination directions having different phase information, wherein the
acquiring at least one first image further comprises the following steps:
based on said assembling the set of original images, reconstruct the original image using a first reconstruction algorithm to obtain the first image, wherein the first reconstruction algorithm is a three-phase reconstruction algorithm and/or a four-phase reconstruction algorithm, the at least one first image having data of intensity information of the detected radiation of the sample, and
in the same detection area of the sample, the at least one first image is acquired at a specified time interval, wherein the at least one first image is configured as an image sequence sorted according to the specified time interval.

2. The method according to claim 1, wherein the specified time interval is at least not greater than 50 ms, and the number of the at least one first image is not less than 50 frames.

3. The method according to claim 1, wherein the correction algorithm comprises a radial fluctuation positioning algorithm, the radial fluctuation positioning algorithm is configured to target each of the at least one first image and marking the intensity center position of the detection radiation based on the radial fluctuation positioning algorithm, thereby obtaining at least one set of marked third images, with marked the intensity center position, wherein the at least one set of the marked third images is configured as specified sequence of images sorted by time interval.

4. The method according to claim 3, wherein the correction algorithm further comprises a correlation algorithm, and the correlation algorithm is configured to be based on a time sequence and a correlation factor calculated from a relationship between intensities in each corresponding pixel in every one of the at least one set of the third images, and
based on the correlation factor in each pixel, obtain the second image.

5. The method according to claim 1, wherein the first resolution is not greater than 200 nm.

6. The method according to claim 5, wherein the first resolution is not greater than 100 nm.

7. The method according to claim 1, wherein the mentioned second resolution is no greater than one-half the first resolution.

8. The method according to claim 7, wherein the mentioned second resolution is no greater than one-third of the first resolution.

9. The method according to claim 8, wherein the second resolution is not greater than 30 nm.

10. An apparatus for microscopic imaging configured to perform the microscopic imaging according to claim 1.

11. A microscope system, comprising the apparatus according to claim 10.

12. The method according to claim 1, wherein the detection radiation comprises an optical signal, in particular a fluorescent signal.

13. The method according to claim 1, wherein the capturing the detection radiation to acquire at least one first image involves at least one of the following techniques: Structured Illumination Microscopy, Stimulated Emission Depletion Microscopy, Confocal Microscopy with a detection array, and Light-activated Positioning Microscopy.

14. The method according to claim 1, wherein the acquiring at least one first image comprises
assembling a set of original images, wherein the set of original images is generated in a detector array containing a plurality of detector elements; and the assembling of the set of original images includes detecting radiation at each original image generated in the detection plane of each detector element.

* * * * *